(12) United States Patent
Duerksen

(10) Patent No.: US 8,968,649 B2
(45) Date of Patent: Mar. 3, 2015

(54) DUAL ELEMENT PRESSURE SWING ADSORPTION AIR PURIFICATION SYSTEM AND METHOD

(75) Inventor: Gary Lynn Duerksen, Ward, CO (US)

(73) Assignee: Empire Technology Developement LLC, Wilmington, DE (US)

( * ) Notice: Subject to any disclaimer, the term of this patent is extended or adjusted under 35 U.S.C. 154(b) by 473 days.

(21) Appl. No.: 13/382,384

(22) PCT Filed: May 16, 2011

(86) PCT No.: PCT/US2011/036646
§ 371 (c)(1),
(2), (4) Date: Jan. 5, 2012

(87) PCT Pub. No.: WO2012/158158
PCT Pub. Date: Nov. 22, 2012

(65) Prior Publication Data
US 2012/0292178 A1    Nov. 22, 2012

(51) Int. Cl.
*C01B 21/04* (2006.01)
*C01B 13/02* (2006.01)
*C01B 13/11* (2006.01)

(52) U.S. Cl.
CPC .......... *C01B 21/0466* (2013.01); *C01B 13/0259* (2013.01); *C01B 13/11* (2013.01)
USPC .............................. 422/28; 204/158.2; 422/22

(58) Field of Classification Search
CPC .............. A61L 2/20; A61L 2/202; A61L 2/26;
A61L 11/00; A61L 2202/00; A61L 2202/10;
A61L 2202/11; A61L 2202/13; A61L
2202/15; C02F 1/50; C02F 1/72; C02F 1/78;
C02F 2201/78; C02F 2202/782; C02F
2209/00; C02F 2209/003

USPC .......................... 422/22, 28–30, 4; 204/158.2
See application file for complete search history.

(56) References Cited

U.S. PATENT DOCUMENTS

| | | | |
|---|---|---|---|
| 3,856,671 A | 12/1974 | Lee et al. | |
| 5,100,521 A * | 3/1992 | Schwarzl | 204/176 |
| 5,275,742 A * | 1/1994 | Satchell et al. | 210/760 |
| 5,503,808 A | 4/1996 | Garbutt et al. | |
| 5,507,957 A * | 4/1996 | Garrett et al. | 210/760 |
| 6,086,772 A * | 7/2000 | Tanimura et al. | 210/760 |
| 6,916,359 B2 | 7/2005 | Jain | |
| 2009/0199710 A1 | 8/2009 | Weist et al. | |
| 2010/0043633 A1 | 2/2010 | Galbraith | |

OTHER PUBLICATIONS

International Preliminary Report on Patentability for Intl. Pat. Appln. No. PCT/US2011/036646, mailed on Nov. 28, 2013, 10 pp.
International Search Report and Written Opinion for PCT/US2011/036646, mailed Jul. 13, 2011.
The Ozmotics Insider, "Its All About the Ozone," Oct. 31, 2008, printed Oct. 4, 2010, retrieved from http://www.ozmoticsinsider.com/2008/10/, 7 pages.

* cited by examiner

*Primary Examiner* — Sean E Conley
(74) *Attorney, Agent, or Firm* — Foley & Lardner LLP

(57) ABSTRACT

The present technology provides an illustrative method for treating air. The method includes providing untreated air and producing an oxygen-enriched sample from the untreated air. The method further includes generating ozone in the oxygen-enriched sample to produce an ozone-enriched sample and contacting the ozone-enriched sample and a fraction of the untreated air to produce a treated sample. The fraction of the untreated sample includes a fraction removed from the untreated air when producing the oxygen-enriched sample. The method also includes removing ozone from the treated sample to form a purified sample of air.

16 Claims, 8 Drawing Sheets

_US 8,968,649 B2_

DUAL ELEMENT PRESSURE SWING ADSORPTION AIR PURIFICATION SYSTEM AND METHOD

CROSS-REFERENCE TO RELATED APPLICATIONS

The present application is a U.S. national stage application claiming the benefit of International Application No. PCT/US2011/036646, filed on May 16, 2011, the entire contents of which is incorporated herein by reference in its entirety.

BACKGROUND

The following description is provided to assist the understanding of the reader. None of the information provided or references cited is admitted to be prior art.

Harmful particles and pollutants are present throughout the environment, and accordingly, the ability to detect and eliminate such pollutants has become increasingly important. Harmful particles and pollutants are commonly found in the air not only in industrial and laboratory settings, but also in everyday living spaces of the public. Accordingly, many countries, municipalities, and governments mandate specific monitoring and air quality reporting to increase awareness and safety for the public. In industrial settings, monitoring and treatment of air pollution may be required for the safety of workers involved in activities that produce hazardous materials or that involve such hazardous materials. Monitoring and treatment of air pollutants are important industries and such methods and devices have innumerable applications; for example, in individual homes and places of business to increase air quality and by individuals in the event of a chemical or biological terrorist attack.

SUMMARY

The present technology provides an illustrative method for treating air. The method includes providing untreated air and producing an oxygen-enriched sample from the untreated air. The method further includes generating ozone in the oxygen-enriched sample to produce an ozone-enriched sample and contacting the ozone-enriched sample and a fraction of the untreated air to produce a treated sample. The fraction of the untreated sample includes a fraction removed from the untreated air when producing the oxygen-enriched sample. The method also includes removing ozone from the treated sample to form a purified sample of air.

The present technology also includes an illustrative apparatus for treating air. The apparatus includes a compressor that compresses untreated air and a fractionation device that produces an oxygen-enriched sample from the untreated air. The apparatus also includes an ozone generator that generates ozone in the oxygen-enriched sample to produce an ozone-enriched sample. The fractionation device is further configured to contact the ozone-enriched sample and a fraction of the untreated air to produce a treated sample. The fraction of the untreated sample includes a fraction removed from the untreated air when producing the oxygen-enriched sample. The apparatus also includes an ozone-selective adsorber that removes ozone from the treated sample to form a purified sample of air.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
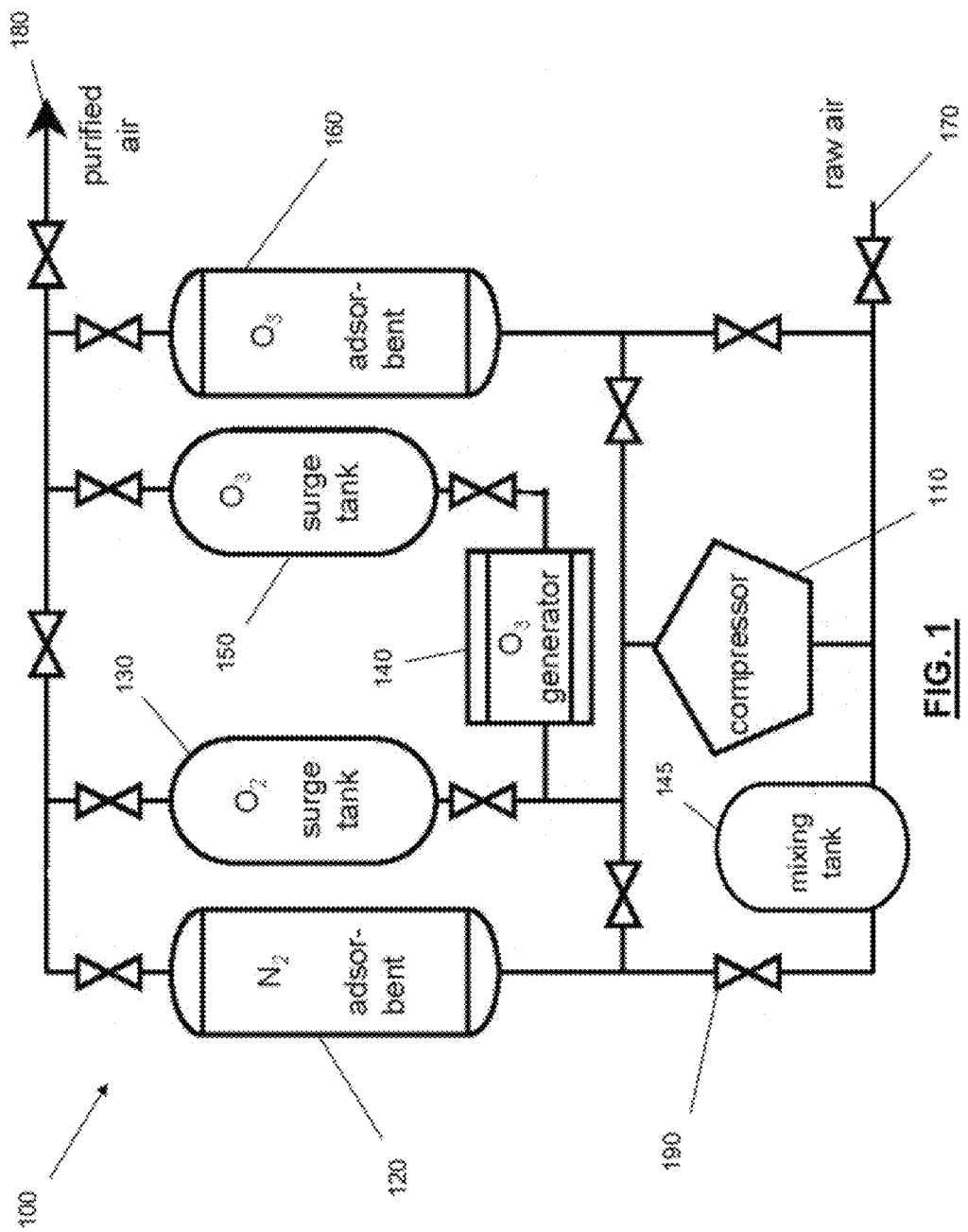
FIG. 1 depicts a pressure-swing adsorption (PSA) air purification system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

While air filtration units are readily available that filter micron-sized particulates, traditional air filtration units do not effectively treat volatile contaminants and often require frequent and expensive filter changes. In addition, while charcoal filters can remove some volatile organic contaminants, they generally do not effectively disinfect or remove particulates and also require frequent and expensive replacement.

Ozone generation devices have been successfully used to disinfect interior spaces and to break down harmful organic species. Ozone may be produced when oxygen ($O_2$) molecules are dissociated by an energy source into oxygen atoms and subsequently collide with an oxygen molecule to form the unstable gas, ozone ($O_3$). Ozone is a strong oxidant and virucide. Several methods of disinfecting pathogenic organisms using ozone include direct oxidation and destruction of cell walls, reactions with radical by-products of ozone composition, damage to constituents of nucleic acids, and destruction of carbon-nitrogen bonds leading to depolymerization. However, ozone itself is harmful to persons and materials. In addition, the generation of ozone often involves the production of other harmful products, for example oxides of nitrogen.

Described herein are illustrative methods and systems for utilization of ozone to disinfect and purify air via a pressure-swing adsorption (PSA) or vacuum PSA air purification system. Such methods and systems allow for the efficient and effective purification of air using concentrated ozone ($O_3$), without the release of such ozone into the ambient environment. In an embodiment, the air purification method includes fractionating the untreated air and separating the oxygen ($O_2$) fraction from the air using PSA or vacuum PSA. The embodiment further includes generating concentrated ozone from the oxygen fraction using an ozone generator and degrading contaminants and disinfecting pathogens in the air by re-combining the air with the concentrated ozone. The embodiment may also include partly decomposing the ozone to oxygen and removing residual ozone from the purified air prior to releasing the air from the air purification system into the ambient environment.

FIG. 1 depicts a pressure-swing adsorption (PSA) air purification system 100 in accordance with an illustrative embodiment. PSA air purification system 100 includes an input 170 through which intake air to be purified is drawn into the system and an output 180 through which the resulting purified air is emitted back into the ambient environment. PSA air purification system 100 further includes fractionation devices such as a nitrogen-selective adsorber 120 and an ozone-selective adsorber 160. Nitrogen-selective adsorber 120 is configured to remove nitrogen ($N_2$) from the intake air to be purified to produce a low-nitrogen oxygen-enriched sample of air. In an embodiment, nitrogen-selective adsorber 120 may include one or more zeolite molecular sieves that exhibit good nitrogen selectivity as known to those of skill in the art (e.g., Y-type zeolites), or any other material sufficient for utilization as a nitrogen-selective adsorbent.

In an alternative embodiment, nitrogen-selective adsorber 120 may be substituted with an oxygen-selective adsorber that is configured to adsorb oxygen from the intake air to produce the oxygen-enriched sample of air. The adsorbed oxygen may then be desorbed and fed to the ozone generator to generate ozone-enriched oxygen as discussed in further detail below. In an embodiment, the oxygen-selective adsorber may include Y-type zeolites. In another embodiment, the oxygen-selective adsorber may include one or more carbon-based or zeolite sieves or any other material sufficient for utilization as an oxygen-selective adsorbent. For example, the carbon-based sieves may include polyolefin blends such as polyethylene. Additional examples of carbon-based sieves that may be used for oxygen-selective adsorption include a porous carbon support in which the average pore size is 2.8-5.2 Angstroms, a carbon molecular sieve that has been impregnated with an acidic species such as $FeCl_3$, and a copper oxide modified carbon molecular sieve. In an embodiment, a carbon molecular sieve is a rate-selective adsorbent in that it adsorbs roughly equal amounts of oxygen and nitrogen at equilibrium, but it adsorbs oxygen at a faster rate. In an alternative embodiment, an equilibrium oxygen-selective adsorbent such as a transition element complex (TEC) BzIm/Co($T_{piv}$PP)/SP-$SiO_2$ [1-benzylimidazole (BzIm) 17% and cobalt (II) picket-fence porphyrin, supported on dense ~5 nm silica nanoparticles (21 wt %) may be utilized. Additional examples of equilibrium oxygen-selective adsorbents include Co(3,5-diBu'salDAP) and CO(3,5-diBu'sal/(ETO)($CO_2$Et).

Ozone-selective adsorber 160 is configured to remove ozone ($O_3$) from a sample of air. In an embodiment, ozone-selective adsorber 160 may also include zeolite molecular sieves as known to those of skill in the art, or any other material sufficient for utilization as an ozone-selective adsorber. The zeolite molecular sieves for ozone-selective adsorber 160 may include high sodium and lanthanum zeolite. Other zeolites what may be used as an ozone-selective adsorbent may include $NH_4$-K-L-zeolite, H-K-L-zeolite, chabazite, erionite, mordenite, offretite, ZSM-5, HZSM-5, ZSM-11, ZSM-12, L-zeolite, ferrierrite, beta zeolite, Y-type zeolite, and combinations thereof. Certain varieties of zeolite are configured to facilitate decomposition of ozone. Examples of such ozone-decomposing zeolites includes ammonium-exchanged L-type zeolite ($NH_4$-K-L zeolite) and H-K-L zeolite with low water content (<0.5%) have been found to enhance the destruction of ozone. In an embodiment, such ozone-decomposing zeolites may be used within ozone-selective adsorber 160 to further increase the removal of ozone from purified air.

PSA air purification system 100 also includes an ozone generator 140 that is configured to generate ozone from an oxygen-enriched sample of air. In an embodiment, ozone generator 140 is a corona discharge ozone generator as known to those of skill in the art. In additional embodiments, ozone generator 140 may include any ozone generation apparatus known to those of skill in the art. For example, ozone generator 140 may include cold plasma/dielectric arc discharge, water electrolysis, or radiochemical ozone generation devices. The generated ozone may be recombined with the oxygen-enriched sample of air in a mixing tank 145 to degrade undesired contaminants and disinfect pathogens in the oxygen-enriched sample of air such that the concentration of undesired contaminants and/or pathogens is greater in the untreated intake air than in air treated with ozone. In an embodiment, the undesired contaminants/pathogens may comprise at least one of mold, pollen, volatile organic compounds, smoke, dust, spores, bacteria, or any other undesired contaminant known to those of skill in the art.

A compressor 110 is configured to compress air/gas and to supply the high pressures for the various stages of the air purification process. One or more valves 190 are arranged throughout PSA air purification system 100 to control the appropriate flow of contents throughout the system. In an embodiment, with appropriate servo control of valves 190 throughout the system, a single compressor 110 can be used to supply high pressure for both high-pressure adsorption stages. In alternative embodiments, multiple compressors may be used to create the pressures for the various stages. In addition, in accordance with an embodiment, PSA air purification system 100 may also include one or more filters and a de-humidifier to treat intake air that is input into the system. The filters may be configured to remove particles greater than a given size from the untreated intake air and the de-humidifier may be configured to remove water vapor from the untreated intake air.

PSA air purification system 100 also includes an oxygen surge tank 130 and an ozone surge tank 150. Oxygen surge tank 130 is configured to store non-adsorbed gas that has been passed through nitrogen-selected adsorber 120. In an embodiment, this non-adsorbed gas is primarily oxygen. Ozone surge tank 150 is configured to store a sample of air that includes concentrated ozone. Accordingly, these surge tanks are used to temporarily store various samples of gas during the various stages of the air purification process.

In an embodiment, PSA air purification system 100 may also include one or more secondary ozone elimination devices that are configured to remove ozone content from purified air. In an embodiment, the one or more secondary ozone elimination devices may include an ozone decomposing catalyst (e.g., magnesium dioxide) or an ultraviolet (UV) light source (e.g., a 254 nanometer (nm) UV light source) that is configured to decompose ozone content. In addition, the one or more secondary ozone elimination devices may also include a device (e.g., a humidifier) that is configured to re-introduce water vapor (such as the water vapor removed from the intake air via the de-humidifier or new water vapor) into the sample of air with the concentrated ozone, as water vapor also may facilitate the decomposition of ozone.

In another embodiment, PSA air purification system 100 may include a four adsorber geometry which would include two nitrogen-selective adsorbers 120 and two ozone-selective adsorbers 160. The redundant nitrogen-selective adsorbers 120 and ozone-selective adsorbers 160, respectively, are operated in parallel but out of phase. According to such an embodiment, compressor 110 would run continually, pressurizing the first adsorber of each pair while the second adsorber of each pair is in its depressurization stage, and vice-versa. The use of such a paired adsorber system also permits pressure equalization, e.g., the separated gas leaving a first adsorber in the depressurization stage is at high pressure, whereas the un-separated gas simultaneously entering the paired adsorber in the pressurization stage is compressed. During pressure equalization operations (i.e., before the separated gas leaving the first of the paired adsorbers is supplied to a surge tank), the gas leaving the first of the paired adsorbers adsorber at high pressure is used to partially pressurize the un-separated gas entering the second of the paired adsorbers. Such a configuration allows for about half of the energy used to create the pressure swing to be recovered.

In an embodiment, the air purification process includes two high pressure adsorption steps, namely the nitrogen adsorption and the ozone adsorption steps, and two low pressure desorption steps for the same adsorbers. According to such an embodiment, the various high and low pressure steps are performed in three stages as described below. The first stage includes a high pressure nitrogen/oxygen separation step and an ozone generation step. The second stage includes a low pressure nitrogen desorption/ozone purge step and a high pressure ozone adsorption/air separation step. The third stage includes a low pressure ozone desorption/oxygen purge step and a high pressure ozone recycling step.

Figure 2A:
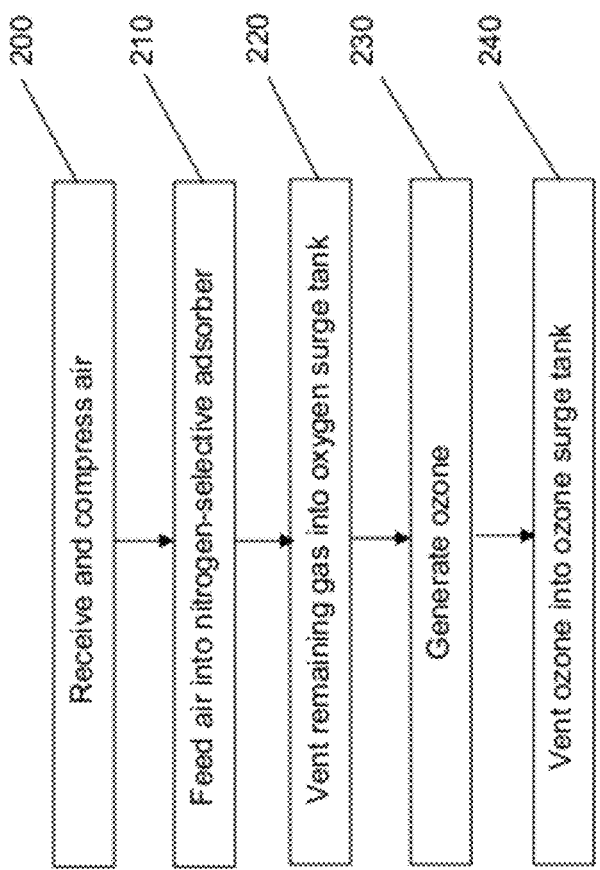
FIG. 2A depicts a flow diagram of a first stage of the air purification process using a nitrogen-selective adsorber in accordance with an illustrative embodiment.
Figure 2B:
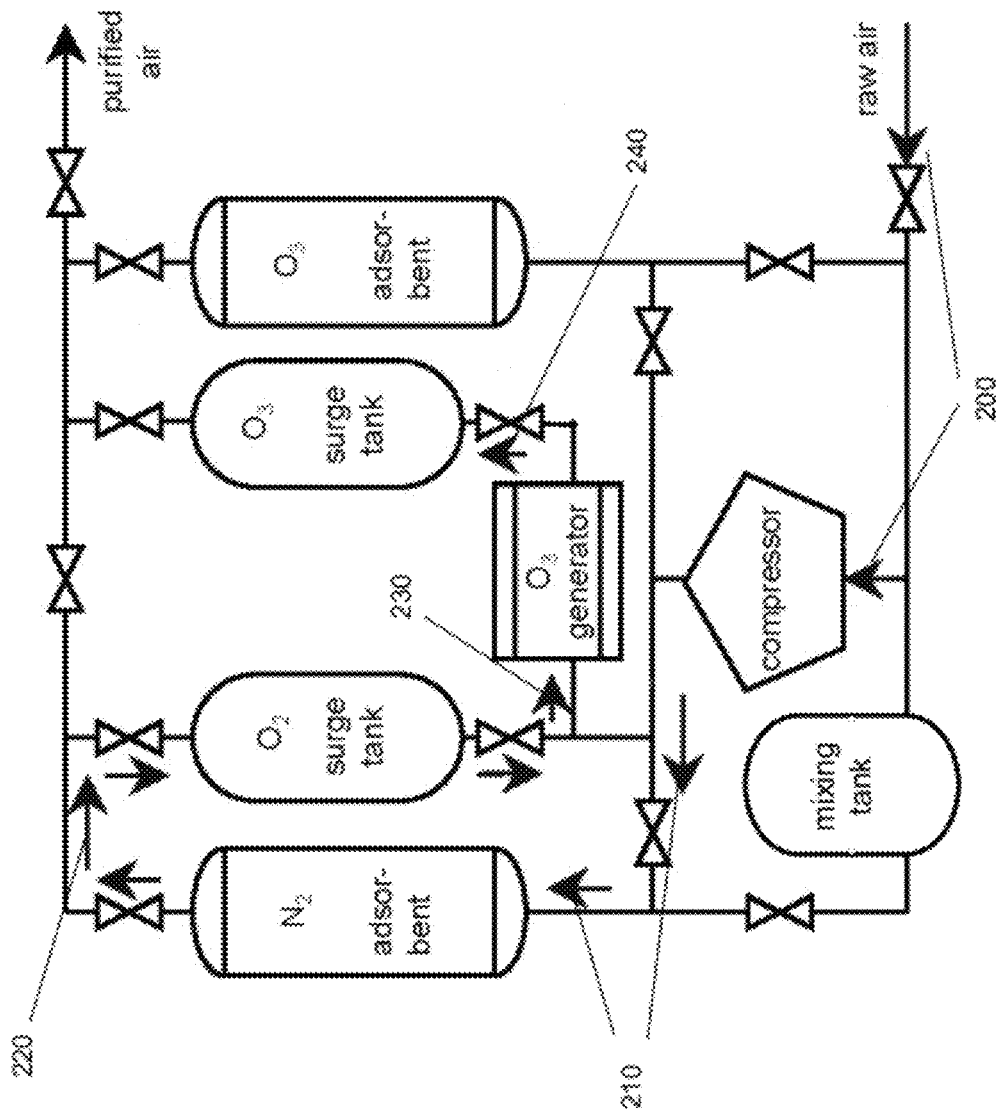
FIG. 2B depicts a pressure-swing adsorption (PSA) air purification system and the flow of gas through the PSA air purification system in accordance with an illustrative embodiment.

FIG. 2A depicts a flow diagram of the first stage of the air purification process in accordance with an illustrative embodiment. FIG. 2B depicts a pressure-swing adsorption (PSA) air purification system and the flow of gas through the PSA air purification system in accordance with an illustrative embodiment of the first stage of the air purification process. In an operation 200, intake air to be purified is received via an input into the PSA air purification system and is compressed via a compressor. In an embodiment, the intake air may also be filtered and de-humidified as known to those of skill in the art.

In an operation 210, the compressed air is fed into a nitrogen-selective adsorber at a high pressure. In an example embodiment, the high adsorption pressure is typically three-times as great as the desorption pressure. In one embodiment, utilizing a pressure swing adsorption system, the high adsorption pressure is brought to approximately 45 pounds per square inch (psi) (310 kpa/3 atm). In another embodiment, utilizing a vacuum pressure swing adsorption system, the high adsorption pressure may be brought to approximately 21 psi (145 kpa/1.4 atm). Alternative embodiments may utilize different pressures for the adsorption and desorption operations as allowable by the particular system. Nitrogen from the compressed air adsorbs to the adsorbents of the nitrogen-selective adsorber, thereby fractionating the air to be purified and creating a high-oxygen content sample of air. In an embodiment, the nitrogen-selective adsorbent comprises one or more zeolite molecular sieves.

In an operation 220, the high-oxygen content sample of air (i.e., the remaining non-adsorbed gas from operation 210) is vented into a surge tank that is configured to store the high-oxygen content sample of air. In an embodiment, this remaining high-oxygen content sample of air is primarily oxygen. Oxygen purity may be limited by Argon content in nitrogen adsorbing systems. The purity of oxygen in these systems is often between 90% and 95% with an Argon content of 4.5% to 5%, which would translate into a relative oxygen purity of between 95% and 99%. In another embodiment, via the use of carbon molecular sieves, oxygen purities of 99% or greater may be possible.

In an operation 230, the high-oxygen content sample of air from the surge tank is flowed into an ozone generator and concentrated ozone is generated within the ozone generator from the high-oxygen content sample of air. In an embodiment, after generation of the concentrated ozone the concentrated ozone within the sample of air comprises about 10% of the sample of air, thereby forming an ozone-enriched sample of air. In other embodiments, ozone concentrations may be less than 1% of the sample of air. The ozone generator may be a corona discharge ozone generator or any ozone generation apparatus known to those of skill in the art.

In an operation 240, the ozone-enriched sample of air is vented into a surge tank that is configured to store the ozone-enriched sample of air. The concentrated ozone degrades contaminants and disinfects pathogens in the ozone-enriched sample of air and when mixed with the nitrogen-enriched sample of air, thereby purifying the sample of air.

Figure 2C:
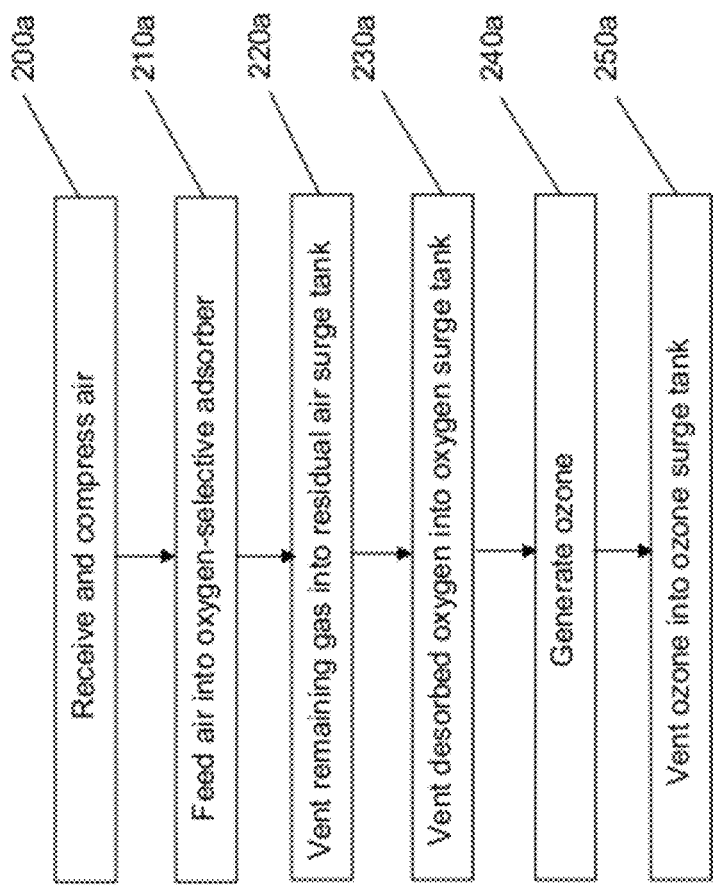
FIG. 2C depicts a flow diagram of a first stage of the air purification process utilizing an oxygen-selective adsorber in accordance with an illustrative embodiment.

In an alternative embodiment, a high-pressure oxygen adsorption process may be used in place of the high pressure nitrogen adsorption steps. FIG. 2C depicts a flow diagram of a first stage of the air purification process utilizing an oxygen-selective adsorber in place of nitrogen-selective adsorber 120 in accordance with an illustrative embodiment. In an operation 200*a*, intake air to be purified is received via an input into the PSA air purification system and is compressed via a compressor. In an embodiment, the intake air may also be filtered and de-humidified as known to those of skill in the art.

In an operation 210*a*, the compressed air is fed into an oxygen-selective adsorber and charged to a high pressure. Oxygen from the compressed air adsorbs to the adsorbents of the oxygen-selective adsorber, thereby fractionating the air to be purified and creating a residual non-oxygenated sample of air. In an embodiment, the oxygen-selective adsorbent comprise one or more Y-type zeolite and carbon molecular sieves or other oxygen-selective adsorbents known to those of skill in the art. In an operation 220*a*, the residual non-oxygenated sample of air (i.e., the remaining non-adsorbed gas from operation 210*a*) is vented into a surge tank that is configured to store the residual gas.

In an operation 230*a*, a low pressure desorption step is performed in which the adsorbed oxygen is desorbed via a low pressure and released to a lower pressure surge tank to form a high-oxygen content sample of air. In an operation 240a, the high-oxygen content sample of air from the surge tank is flowed into an ozone generator and concentrated ozone is generated within the ozone generator from the high-oxygen content sample of air. The ozone generator may be a corona discharge ozone generator or any ozone generation apparatus known to those of skill in the art.

In an operation 250a, the ozone-enriched sample of air is vented into a surge tank that is configured to store the ozone-enriched sample of air. In an embodiment, the ozone-enriched sample of air is combined with the residual non-adsorbed gas from operation 210a in a mixing tank. The concentrated ozone degrades contaminants and disinfects pathogens within the ozone-enriched sample of air and/or any gas combined with the ozone-enriched sample of air, thereby purifying the sample of air.

Figure 3A:
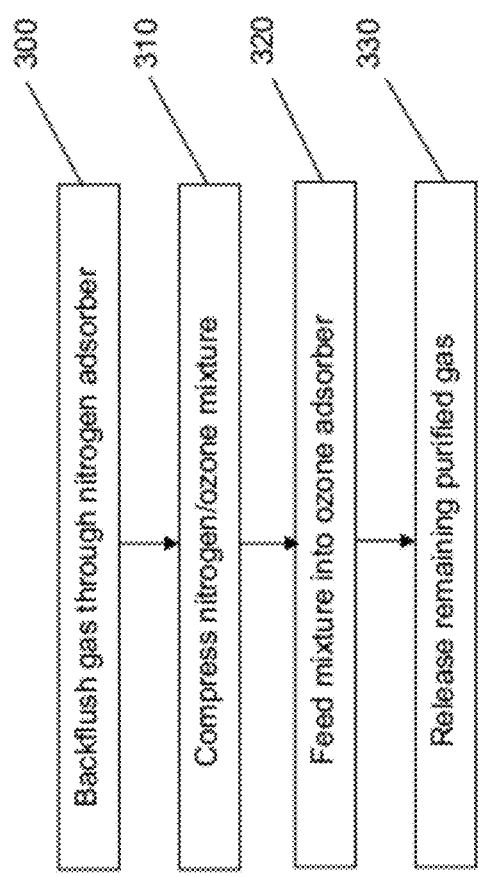
FIG. 3A depicts a flow diagram of a second stage of the air purification process in accordance with an illustrative embodiment.
Figure 3B:
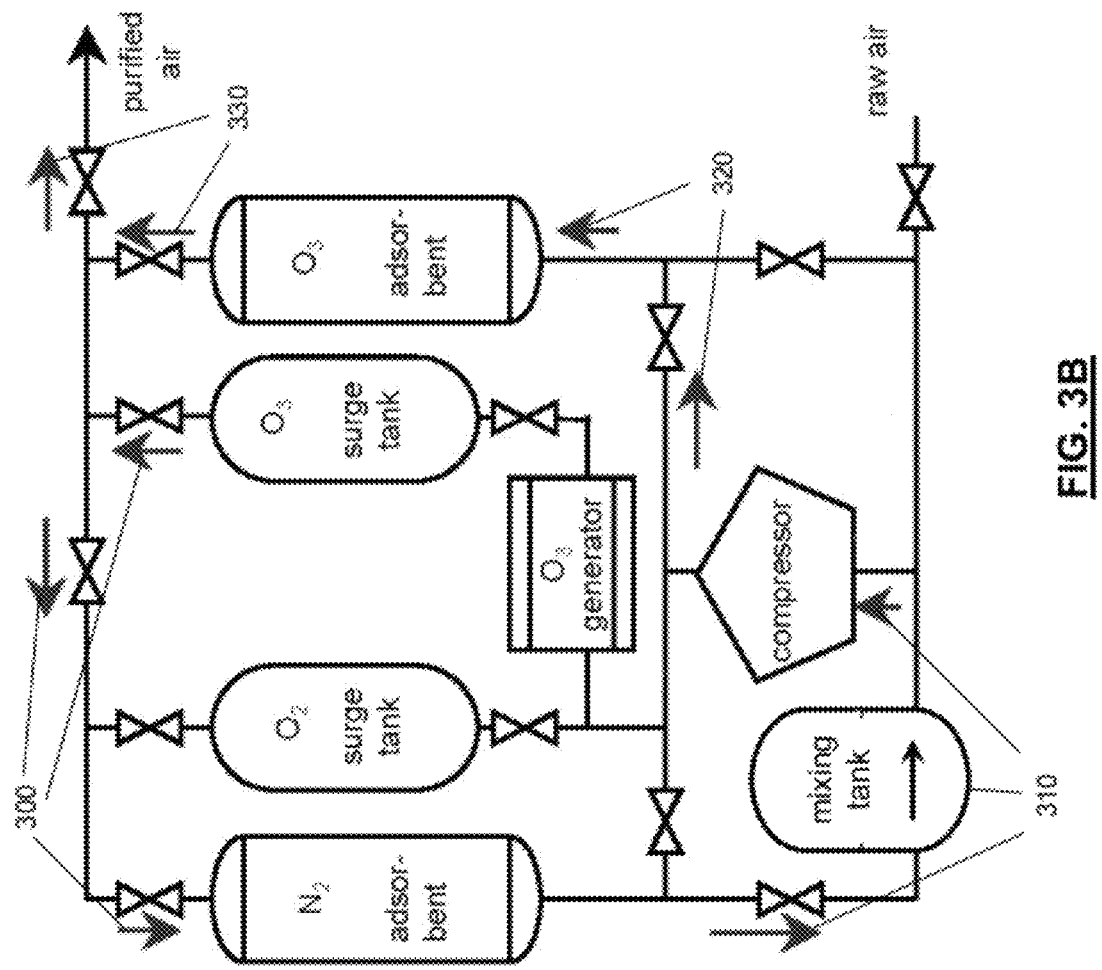
FIG. 3B depicts a pressure-swing adsorption (PSA) air purification system and the flow of gas through the PSA air purification system in accordance with an illustrative embodiment.

FIG. 3A depicts a flow diagram of a second stage of the air purification process in accordance with an illustrative embodiment. FIG. 3B depicts a pressure-swing adsorption (PSA) air purification system and the flow of gas through the PSA air purification system in accordance with an illustrative embodiment of the second stage of the air purification process. In an operation 300, gas from the surge tank storing the ozone-enriched sample of air is back-flushed through the nitrogen-selective adsorber at low pressure to desorb the previously-adsorbed nitrogen from the nitrogen-selective adsorber, thereby forming a treated sample of air. In an embodiment, the low desorption pressure is approximately one third of the high adsorption pressure. In one embodiment, utilizing a PSA system, the low desorption pressure may be approximately 15 psi (103 kpa/1 atm). In another embodiment, utilizing a vacuum PSA system, the low desorption pressure may be approximately 7 psi (48 kpa/0.5 atm).

In an operation 310, the treated sample of air in the mixing tank (which includes the ozone-enriched sample of air combined with the desorbed nitrogen from operation 300) is fed to the compressor where it is compressed and thereby pressurized. In an embodiment, the pressure used in a PSA ozone-selective adsorber is approximately 30 psi (207 kpa/2 atm), although lower pressures (around 17 psi (117 kpa/1.2 atm)) can be used in vacuum PSA systems. Alternative embodiments may include different pressures. In an operation 320, this compressed treated sample of air is fed at high pressure into an ozone-selective adsorber with strong ozone selectivity such that the ozone is removed from the compressed treated sample of air, thereby forming a purified sample of air. In an embodiment, water vapor may be re-introduced into the compressed treated sample of air prior to the sample of air being fed into the ozone-selective adsorber. Water vapor may facilitate the decomposition of ozone caused by the adsorption to various zeolites. The re-introduced water vapor may include the water vapor removed from the intake air via a de-humidifier or may include entirely new water vapor that was not previously removed from the intake air.

In an embodiment, the ozone present in the treated sample of air may be monitored via chemiluminescence, UV photometry, or any other ozone monitoring processes or devices known to those of skill in the art to ensure that the ozone has been sufficiently removed from the treated sample of air. In one possible embodiment, a control loop may measure the ozone levels at the desorption stage of the ozone-selective adsorber using a commercially-available ozone monitor. When the levels of desorbed ozone rise, more ozone may be fed back to mix with the air fraction to be purified, so that ozone generation by the corona generator can be reduced proportionally, thereby reducing the desorbed ozone output from the ozone-selective adsorber. In a second loop, the ozone levels in the treated air exiting the system can be measured by an ambient ozone monitor, and if they rise above a predetermined threshold, e.g., 0.1 ppm, the adsorption period in the ozone-selective adsorber can be lengthened to increase the destruction of ozone via catalysis by the adsorbent, thereby slowing the air intake rate at the first stage and slowing the feed rate to a secondary ozone destruction system at the output.

In another embodiment, the purified sample of air may be further treated after operation 320 to remove any remaining ozone from the purified sample of air. For example, a secondary ozone elimination device such as an ozone-decomposing catalyst (e.g., magnesium dioxide) may be used to decompose ozone from the purified sample of air. Other secondary ozone decomposition methods may include secondary photolytic destruction using an ultraviolet light source as known to those of skill in the art. In an operation 330, the purified sample of air is released into the ambient environment from the PSA air purification system.

Figure 4A:
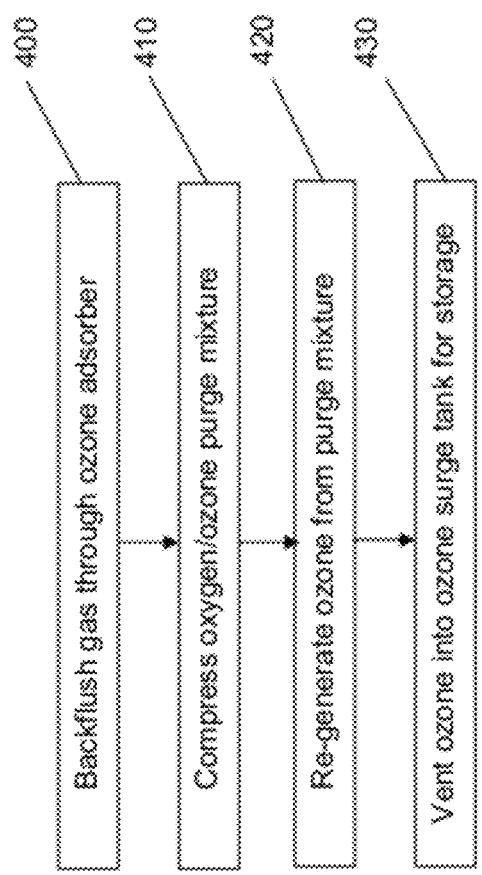
FIG. 4A depicts a flow diagram of a third stage of the air purification process in accordance with an illustrative embodiment.
Figure 4B:
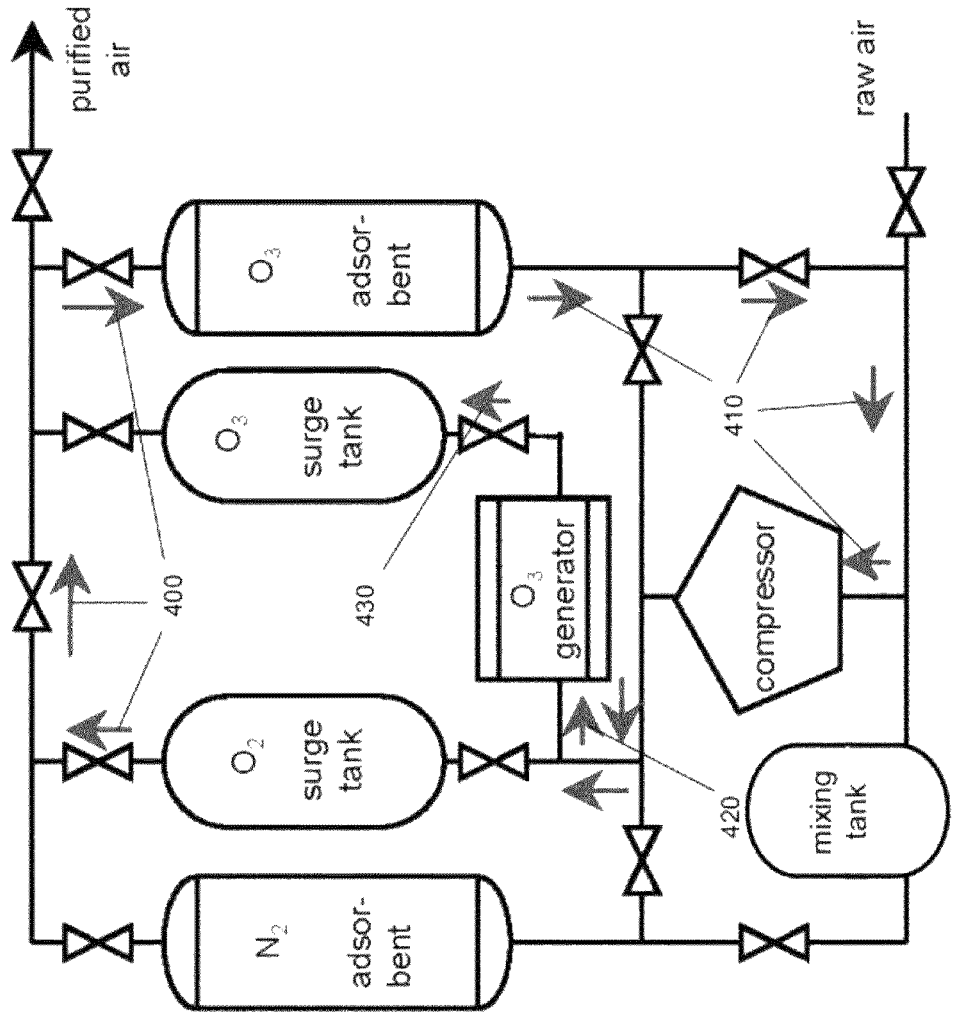
FIG. 4B depicts a pressure-swing adsorption (PSA) air purification system and the flow of gas through the PSA air purification system in accordance with an illustrative embodiment.

FIG. 4A depicts a flow diagram of a third stage of the air purification process in accordance with an illustrative embodiment. FIG. 4B depicts a pressure-swing adsorption (PSA) air purification system and the flow of gas through the PSA air purification system in accordance with an illustrative embodiment of the third stage of the air purification process. In an operation 400, the oxygen surge tank is purged and remaining gas from the oxygen surge tank is back-flushed through the ozone-selective adsorber at low pressure to desorb remaining ozone that has not decomposed within the ozone-selective adsorber, thereby forming a purged gas mixture that include purged gas from the oxygen surge tank and desorbed ozone from the ozone-selective adsorber. In an embodiment, the low pressure during the desorption stages is approximately one third of the higher pressure during the adsorption stages. In one embodiment, utilizing a PSA system, the low desorption pressure may be approximately 15 psi (103 kpa/1 atm). In another embodiment, utilizing a vacuum PSA system, the low desorption pressure may be approximately 7 psi (48 kpa/0.5 atm). Alternative embodiments may utilize different pressures for the adsorption and desorption operations as allowable by the particular system.

In an embodiment, the ozone-selective adsorber includes zeolite molecular sieves that facilitate the decomposition of adsorbed ozone. For example, such zeolites may include ammonium-exchanged L-type zeolite ($NH_4$-K-L zeolite), H-K-L zeolite with low water content, or any other ozone-selective zeolite known to those of skill in the art.

In an operation 410, the purged gas mixture is fed from the ozone-selective adsorber to the compressor where it is compressed and thereby pressurized. In an operation 420, the compressed purged gas mixture is fed to the ozone generator where ozone is re-generated from the compressed purged gas mixture. In an operation 430, the re-generated ozone and any other remnants of the compressed purged gas mixture are stored in the ozone surge tank for future air purification use.

EXAMPLES

Example 1

Single-Bed Pressure Swing Adsorption Air Purification System for Light Commercial Use A first example embodiment involves a small product that could be used as a stand alone unit for light commercial use. Such a product has dimensions of approximately 60 cm×40 cm×30 cm and includes a capacity of approximately 75

Nm³/H (normal cubic meters per hour). Such a unit utilizes a single-bed pressure swing adsorption system that includes an oxygen-selective adsorber, an ozone-selective adsorber, a screw-type compressor, and a corona ozone generator. The oxygen-selective adsorber comprises a carbon molecular sieve that selectively adsorbs oxygen from the sample of air. The ozone-selective adsorber includes an ozone-selective molecular sieve that includes an ammonium-substituted low-silica zeolite. The oxygen-selective adsorber and the ozone-selective adsorber communicate through a high-pressure oxygen surge tank and a low-pressure mixing tank in which nitrogen and ozone are mixed.

Intake air is brought into the system via the screw-type compressor and a sample of the intake air is passed to the oxygen-selective adsorber and charged to a pressure of approximately 45 psi (310 kpa/3 atm). After the pressure of the sample of intake air within the oxygen-selective adsorber reaches approximately 45 psi (310 kpa/3 atm), the non-adsorbed gas from the sample of intake air is bled from the oxygen-selective adsorber to a surge tank at a gradually decreasing pressure. In an embodiment, the above step takes approximately 50 seconds.

After the pressure within the oxygen-selective adsorber reaches approximately 14 psi or 1 atmosphere (96 kpa) (i.e., one third of the target pressure for the high pressure adsorption stage), the adsorbed oxygen is desorbed from the oxygen-selective adsorber and provided to a low-pressure surge tank where it may be combined with recycled ozone from the ozone-selective adsorber. In an embodiment, this desorption process takes approximately 10 seconds.

The combination of the desorbed oxygen and recycled ozone is then moved into the corona ozone generator to produce an ozone-enriched sample of oxygen. The ozone-enriched sample of oxygen is then combined in a mixing tank with the non-adsorbed gas from the above adsorption step which comprises primarily nitrogen to generate a treated sample of air. The treated sample of air is then passed to the ozone-selective adsorber. The treated sample of air is charged to a pressure of approximately 30 psi (207 kpa/2 atm) within the ozone-selective adsorber to adsorb the ozone and to generate a purified sample of air. After the pressure of the treated sample of air within the ozone-selective adsorber reaches approximately 30 psi (207 kpa/2 atm), the non-adsorbed gas (i.e., the purified sample of air) is bled from the ozone-selective adsorber and is flowed through a secondary ozone destroying catalyst such as $MgO_2$ and then output into the ambient environment. In an embodiment, the above step takes approximately 90 seconds.

After the pressure within the ozone-selective adsorber reaches approximately 14 psi or 1 atmosphere (96 kpa), the adsorbed ozone is desorbed from the ozone-selective adsorber and provided to a low-pressure surge tank where it may be combined with oxygen from the oxygen-selective adsorber. In an embodiment, this desorption process takes approximately 30 seconds.

Example 2

Dual-Bed Vacuum Pressure Swing Adsorption Air Purification System for Industrial Use A second example embodiment involves a large unit that is suitable for industrial use. Such a product has dimensions of approximately 180 cm×200 cm×150 cm and includes a capacity of approximately 600 Nm³/H. Such a unit utilizes a dual-bed vacuum pressure swing adsorption configuration to provide continuous flow and reduce energy costs. The system includes a Roots-type blower/compressor, two nitrogen-selective adsorbers, two ozone-selective adsorbers, a corona generator, and a vacuum pump. The nitrogen-selective adsorbers comprise a zeolite molecular sieve such as ZSM-5 as the nitrogen adsorbent to selectively adsorb nitrogen from the sample of air. The ozone-selective adsorber includes an ammonium-substituted de-aluminated L-type zeolite as the ozone adsorbent. The nitrogen-selective adsorber and the ozone-selective adsorber communicate through a high-pressure oxygen surge tank and a low-pressure mixing tank in which nitrogen and ozone are combined.

During operation of the system, the two nitrogen-selective adsorbers operate out-of-phase so that the compressor and vacuum pump operate continuously and so that pressure equalization may be used to partly pressurize one adsorber due to the depressurization of another. Intake air is brought into the system via the Roots-type compressor and a sample of the intake air is intermittently passed to the respective nitrogen-selective adsorbers. The sample of intake air within the respective nitrogen-selective adsorbers is charged to a pressure of approximately 21 psi (145 kpa/1.4 atm). After the pressure of the sample of intake air within the nitrogen-selective adsorber reaches approximately 21 psi (145 kpa/1.4 atm), the non-adsorbed gas from the sample of intake air (which consists primarily of oxygen) is bled from the nitrogen-selective adsorber to a surge tank at a gradually decreasing pressure where it is stored as an oxygen-enriched sample of air. In an embodiment, the above step takes approximately 100 seconds.

After the pressure within the nitrogen-selective adsorber reaches approximately 7 psi or 0.5 atmospheres (48 kpa) (i.e., one third of the target pressure for the high pressure adsorption stage), the adsorbed nitrogen is desorbed from the nitrogen-selective adsorber and provided to a low-pressure mixing tank where it may be combined with ozone-enriched oxygen to generate a treated sample of air. In an embodiment, this desorption process takes approximately 20 seconds.

The oxygen-enriched sample of air is combined with recycled ozone from one or both of the ozone-selective adsorbers and is moved into the corona ozone generator to produce ozone-enriched oxygen. The ozone-enriched oxygen is then mixed with the desorbed nitrogen from the above desorption step to generate a treated sample of air. The treated sample of air is then passed to the ozone-selective adsorber. The treated sample of air is charged to a pressure of approximately 20 psi (138 kpa/1.4 atm) within the ozone-selective adsorber to adsorb the ozone and to generate a purified sample of air. After the pressure of the treated sample of air within the ozone-selective adsorber reaches approximately 20 psi (138 kpa/1.4 atm), the non-adsorbed gas (i.e., the purified sample of air) is bled from the ozone-selective adsorber and is flowed through a secondary ozone destroying catalyst such as $MgO_2$ and then output into the ambient environment. In an embodiment, the above step takes approximately 90 seconds.

After the decreasing pressure within the ozone-selective adsorber reaches approximately 10 psi (69 kpa/0.7 atm), the adsorbed ozone is desorbed from the ozone-selective adsorber and provided to a low-pressure surge tank where it may be combined with an oxygen-enriched sample of air. In an embodiment, this desorption process takes approximately 30 seconds.

The table below details various design and operational parameters for the air purification units of examples 1 and 2 above:

|  | Example 1 | Example 2 |
|---|---|---|
| Separation method | Pressure Swing Adsorption | Vacuum Pressure Swing Adsorption |
| Number of adsorbers | 2 | 4 |
| Compressor/pumps | Screw-type | Roots blower/Vacuum pump |
| Adsorbed Gas | $O_2/O_3$ | $N_2/O_3$ |
| Adsorbent | CMS/$NH_4$-substituted-ZMS | ZMS-5/$NH_4$-substituted-ZMS |
| Pressure (psi) adsorption/desorption | 45/14.7   30/14.1 | 21/7   20/10 |
| Secondary ozone removal | $MgO_2$-type catalyst | $MgO_2$-type catalyst |
| Cycle time (s) | 50/10   90/30 | 100/20   90/30 |
| Capacity ($Nm^3$/H) | 75 | 600 |
| Approximate dimensions (cm) | 60 × 40 × 30 | 180 × 200 × 150 |

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for treating air, the method comprising:
providing untreated air from an ambient environment;
separating the untreated air to produce a first sample and a second sample, wherein the first sample is oxygen-enriched;
generating ozone in the first sample to produce an ozone-enriched sample;
contacting the ozone-enriched sample and at least a portion of the second sample to produce a treated sample;
removing ozone from the treated sample to form a purified sample of air; and
returning the purified sample of air to the ambient environment.

2. The method of claim 1, wherein the second sample comprises nitrogen, and wherein the step of separating the untreated air comprises removing nitrogen from the untreated air.

3. The method of claim 2, wherein the step of contacting the ozone-enriched sample and the at least a portion of the second sample comprises contacting the removed nitrogen and the ozone-enriched sample to produce a treated sample.

4. The method of claim 2, further comprising compressing the untreated air prior to the step of removing nitrogen from the untreated air.

5. The method of claim 4, wherein the step of removing nitrogen from the untreated air comprises adsorbing nitrogen from the compressed untreated air at a high pressure by contacting the untreated air with at least one nitrogen-selective adsorbent.

6. The method of claim 5, wherein the at least one nitrogen-selective adsorbent comprises at least one zeolite molecular sieve.

7. The method of claim 3, wherein the step of contacting the removed nitrogen and the ozone-enriched sample comprises contacting the ozone-enriched sample with at least one nitrogen-selective adsorbent to desorb the adsorbed nitrogen.

8. The method of claim 1, wherein the step of generating ozone comprises generating the ozone with a corona discharge system, the method further comprising venting the ozone-enriched sample into a surge tank.

9. The method of claim 1, wherein the step of removing the ozone from the treated sample comprises contacting the treated sample with at least one ozone-selective adsorbent under conditions where the ozone is removed from the treated sample.

10. The method of claim 1, wherein the step of removing the ozone comprises compressing the treated sample and contacting the compressed treated sample with an ozone-selective adsorber.

11. The method of claim 10, further comprising venting the oxygen-enriched sample into a surge tank.

12. The method of claim 11, further comprising contacting the oxygen-enriched sample with an ozone-selective adsorption bed to desorb adsorbed ozone to form a purged gas.

13. The method of claim 12, further comprising regenerating ozone from the purged gas with a corona discharge system.

14. The method of claim 1, further comprising treating the purified sample of air with ultraviolet light.

15. The method of claim 1, wherein a concentration of an undesired contaminant is lower in the purified sample of air than in the untreated air.

16. The method of claim 15, wherein the undesired contaminant comprises at least one of mold, pollen, volatile organic compounds, smoke, dust, spores, and bacteria.

* * * * *

UNITED STATES PATENT AND TRADEMARK OFFICE
CERTIFICATE OF CORRECTION

| | | |
|---|---|---|
| PATENT NO. | : 8,968,649 B2 | Page 1 of 1 |
| APPLICATION NO. | : 13/382384 | |
| DATED | : March 3, 2015 | |
| INVENTOR(S) | : Duerksen | |

It is certified that error appears in the above-identified patent and that said Letters Patent is hereby corrected as shown below:

On the title page, item (73), under "Assignee", in Column 1, Line 1, delete "Empire Technology Developement LLC" and insert -- Empire Technology Development LLC --, therefor.

On the title page, item (56), under "OTHER PUBLICATIONS", in Column 2, Line 5, delete ""Its All" and insert -- "It's All --, therefor.

In the specification,

In Column 1, Line 8, delete "application" and insert -- application filing under 35 U.S.C. § 371 --, therefor.

In Column 4, Line 3, delete "[1" and insert -- 1 --, therefor.

In Column 4, Line 7, delete "CO(3,5-diBu'sal/(ETO)(CO$_2$Et)." and insert -- Co(3,5-diBu'sal/(ETO)(CO$_2$Et)). --, therefor.

Signed and Sealed this
Twelfth Day of January, 2016

Michelle K. Lee
*Director of the United States Patent and Trademark Office*